(12) United States Patent
Gollier et al.

(10) Patent No.: US 7,916,769 B2
(45) Date of Patent: Mar. 29, 2011

(54) OPTICAL PACKAGE HAVING DEFORMABLE MIRRORS FOR FOCUS COMPENSATION

(75) Inventors: Jacques Gollier, Painted Post, NY (US); Garrett Andrew Piech, Horseheads, NY (US)

(73) Assignee: Corning Incorporated, Corning, NY (US)

(*) Notice: Subject to any disclaimer, the term of this patent is extended or adjusted under 35 U.S.C. 154(b) by 212 days.

(21) Appl. No.: 12/427,939

(22) Filed: Apr. 22, 2009

(65) Prior Publication Data

US 2009/0274178 A1 Nov. 5, 2009

Related U.S. Application Data

(60) Provisional application No. 61/049,212, filed on Apr. 30, 2008.

(51) Int. Cl.
*H01S 3/08* (2006.01)

(52) U.S. Cl. .................... 372/107; 356/121

(58) Field of Classification Search .......... 356/484, 356/520; 372/107, 21, 22
See application file for complete search history.

(56) References Cited

U.S. PATENT DOCUMENTS

| 4,393,303 A * | 7/1983 | Spinhirne .......... 250/201.9 |
| 5,514,867 A | 5/1996 | Beyer et al. |
| 6,891,676 B2 * | 5/2005 | Ford et al. .......... 359/572 |
| 2003/0067610 A1 | 4/2003 | Davies |
| 2004/0085657 A1 | 5/2004 | Gullapalli et al. |
| 2004/0218032 A1 | 11/2004 | Yamaguchi |
| 2005/0151960 A1 * | 7/2005 | Gerwe et al. .......... 356/121 |
| 2008/0080032 A1 | 4/2008 | Shiraishi |
| 2008/0144041 A1 * | 6/2008 | Muenter .......... 356/484 |
| 2009/0110013 A1 * | 4/2009 | Gollier et al. .......... 372/22 |

* cited by examiner

*Primary Examiner* — Minsun Harvey
*Assistant Examiner* — Tuan N. Nguyen
(74) *Attorney, Agent, or Firm* — Kwadjo Adusei-Poku

(57) ABSTRACT

An optical package includes a semiconductor laser, an adjustable mirror and a wavelength conversion device comprising a waveguide portion. The semiconductor laser, adjustable mirror, and wavelength conversion device are oriented to form an optical pathway between an output of the semiconductor laser and an input of the wavelength conversion device. The beam of the semiconductor laser is directed along the optical pathway and onto the adjustable mirror where the beam is reflected by the adjustable mirror onto the waveguide portion of the wavelength conversion device. The adjustable mirror may also be either thermally or mechanically deformable such that, when the adjustable mirror is deformed, the path of the beam along the optical pathway is altered thereby focusing the beam on the waveguide portion of the wavelength conversion device. The adjustable mirror may be adjusted such that the beam of the semiconductor laser is positioned on the waveguide portion of the wavelength conversion device.

17 Claims, 7 Drawing Sheets

OPTICAL PACKAGE HAVING DEFORMABLE MIRRORS FOR FOCUS COMPENSATION

CROSS REFERENCE TO RELATED APPLICATIONS

The present application claims priority to U.S. Provisional Patent Application Ser. No. 61/049,212, filed on Apr. 30, 2008.

BACKGROUND

The present invention generally relates to semiconductor lasers, laser controllers, optical packages, and other optical systems incorporating semiconductor lasers. More specifically, the present invention relates to the use of deformable mirrors for focus compensation in optical packages that include, inter alia, a semiconductor laser and a second harmonic generation (SHG) crystal or another type of wavelength conversion device.

BRIEF SUMMARY

Short wavelength light sources can be formed by combining a single-wavelength semiconductor laser, such as an infrared or near-infrared distributed feedback (DFB) laser, distributed Bragg reflector (DBR) laser, or Fabry-Perot laser, with a light wavelength conversion device, such as a second harmonic generation (SHG) crystal. Typically, the SHG crystal is used to generate higher harmonic waves of the fundamental laser signal. To do so, the lasing wavelength is preferably tuned to the spectral center of the wavelength converting SHG crystal and the output of the laser is preferably aligned with the waveguide portion at the input facet of the wavelength converting crystal.

Waveguide optical mode field diameters of typical SHG crystals, such as MgO-doped periodically poled lithium niobate (PPLN) crystals, can be in the range of a few microns. As a result, the present inventors have recognized that it can be very challenging to properly align the beam from the laser diode with the waveguide of the SHG crystal and maintain the alignment over the lifetime of the optical package and over large operational temperature variations. One possible solution to this problem is to use a mirror system capable of tip/tilt adjustment to perform the lateral alignment of the beam with the waveguide of the SHG crystal. For example, a micro-opto-electromechanical system (MOEMS), micro-electrical mechanical system (MEMS) or similar actuator systems may be operatively coupled to a mirror thereby facilitating tip-tilt adjustment of the mirror. These solutions give excellent results in the lateral dimensions, but do not provide sufficient degrees of freedom to effectuate focusing the beam on the waveguide. While less critical than lateral alignment of the beam with the waveguide, the lack of focus of the beam on the waveguide may significantly decrease the coupling efficiency of the semi-conductor laser with the waveguide. This effect may be more pronounced if the device is exposed to large temperature variations which may further degrade the focus of the beam. Moreover, in lieu of a focus actuator, the precision assembly of the various components in the optical package to a level of a few microns may be required in the axial or focus dimension. Requiring such precision may significantly increase the complexity of the assembly operation and increase the cost of the optical package accordingly.

According to one embodiment, an optical package includes a semiconductor laser, an adjustable mirror and a wavelength conversion device comprising a waveguide portion. The semiconductor laser, adjustable mirror, and wavelength conversion device are oriented to form an optical pathway between an output of the semiconductor laser and an input of the wavelength conversion device. The beam of the semiconductor laser is directed along the optical pathway and onto the adjustable mirror where the beam is reflected by the adjustable mirror onto the waveguide portion of the wavelength conversion device. The adjustable mirror may also be either thermally or mechanically deformable such that, when the adjustable mirror is deformed, the path of the beam along the optical pathway is altered thereby focusing the beam on the waveguide portion of the wavelength conversion device. The adjustable mirror may also be adjusted such that the beam of the semiconductor laser is positioned on the waveguide portion of the wavelength conversion device.

Additional features and advantages of the invention will be set forth in the detailed description which follows and, in part, will be readily apparent to those skilled in the art from that description or recognized by practicing the invention as described herein, including the detailed description which follows, the claims, as well as the appended drawings. It is to be understood that both the foregoing general description and the following detailed description present embodiments of the invention and are intended to provide an overview or framework for understanding the nature and character of the invention as it is claimed.

BRIEF DESCRIPTION OF THE DRAWINGS

The following detailed description of specific embodiments of the present invention can be best understood when read in conjunction with the following drawings, where like structure is indicated with like reference numerals and in which:

Accordingly, FIGS. 1-12 are representative of the positioning and orientation of the various components comprising the optical package shown and described herein. However, it should be understood that FIGS. 1-9 and 11-12 are not to scale and that the size and positioning of certain components are exaggerated to better illustrate the interplay between the various components.

DETAILED DESCRIPTION OF THE ILLUSTRATIVE EMBODIMENTS

Figure 1:
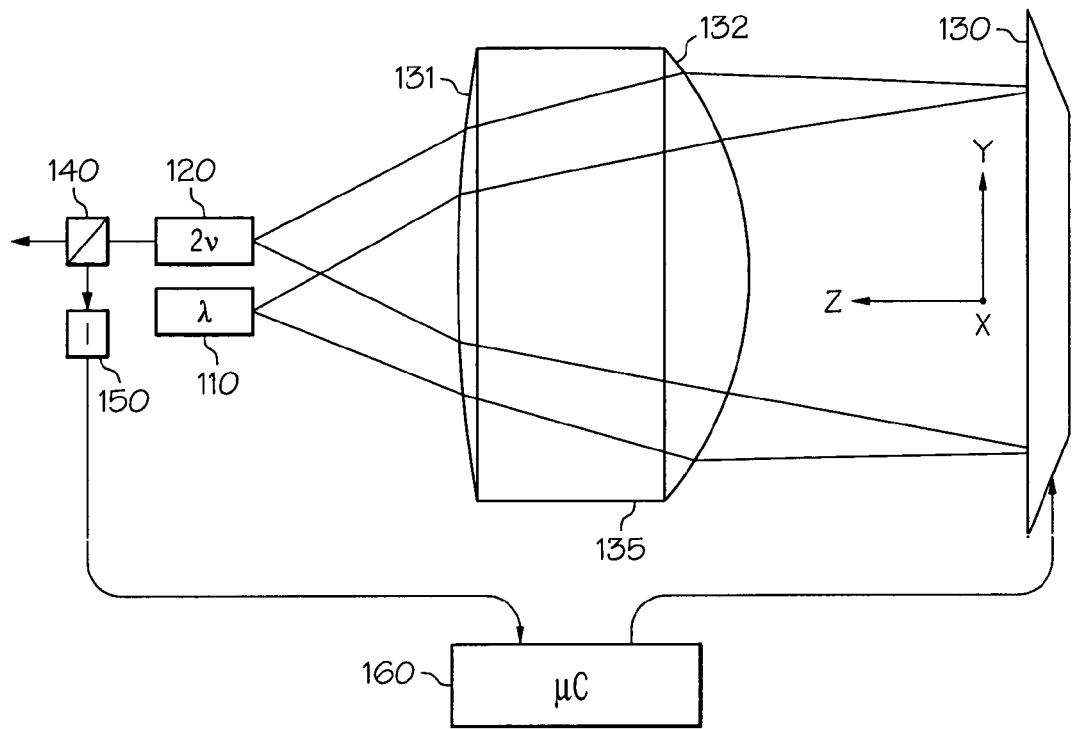
FIG. 1 is a schematic illustration of a MEMS mirror-enabled optical alignment package according to one embodiment of the present invention.

Referring initially to FIG. 1, although the general structure of the various types of optical packages in which the concepts of particular embodiments of the present invention can be incorporated is taught in readily available technical literature relating to the design and fabrication of frequency or wavelength-converted semiconductor laser sources, the concepts of particular embodiments of the present invention may be conveniently illustrated with general reference to an optical package including, for example, a semiconductor laser 110 (labeled "λ" in FIG. 1) and a wavelength conversion device 120 (labeled "2ν" in FIG. 1). In the configuration depicted in FIG. 1, the near infrared light emitted by the semiconductor laser 110 is coupled into a waveguide portion of the wavelength conversion device 120 by one or more adjustable mirrors 130 and a suitable lens assembly 135, which lens assembly 135 may comprise one or more optical elements of unitary or multi-component configuration. The optical package illustrated in FIG. 1 is particularly useful in generating a variety of shorter wavelength laser beams from a variety of longer wavelength semiconductor lasers and can be used, for example, as a visible laser source in a laser projection system.

Figure 2:
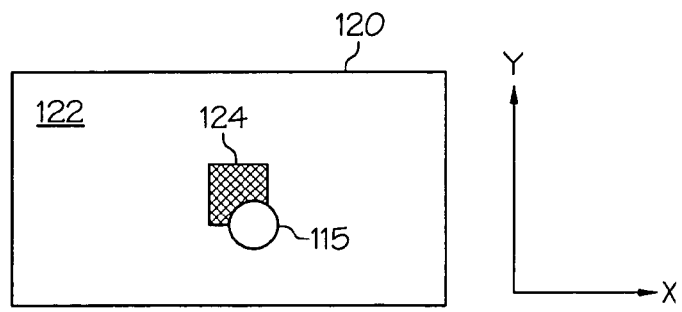
FIG. 2 is a schematic illustration of a beam spot of the semiconductor laser positioned on a waveguide portion of the wavelength conversion device.

The adjustable mirror 130 is particularly helpful because it is often difficult to align the output beam emitted by the semiconductor laser 110 with the waveguide portion of the wavelength conversion device 120. For example, waveguide optical mode field diameters of typical SHG crystals, such as MgO-doped periodically poled lithium niobate (PPLN) crystals, can be in the range of a few microns. Referring to FIGS. 1 and 2 collectively, the lens assembly 135 cooperates with the adjustable mirror 130 to generate a beam spot 115 of comparable size on the input face 122 of the wavelength conversion device 120. The adjustable mirror 130 is configured to introduce beam angular deviation by adjusting a drive mechanism of the adjustable mirror and, as such, can be used to actively align the beam spot 115 with the waveguide portion 124 of the wavelength conversion device 120 by altering the position of the beam spot 115 on the input face 122 of the wavelength conversion device 120 until it is aligned with the waveguide portion 124 of the wavelength conversion device 120.

In one embodiment, beam alignment may be monitored by providing, for example, a beam splitter 140 and an optical detector 150 in the optical path of the wavelength conversion device 120. The optical detector 150 may be operably connected to a microcontroller or controller 160 (labeled "μc" in FIG. 1) such that an output signal from the optical detector 150 is received by the controller 160. The controller 160 may be configured to control the position or state of the adjustable mirror 130 by adjusting a drive mechanism of the adjustable mirror and, as such, position the output beam of the semiconductor laser 110 on the input face 122 of the wavelength conversion device 120. In one embodiment the controller 160 may be used to control the position or state of the adjustable mirror 130 as a function of the output signal received from the optical detector 150. In another embodiment, the controller 160 may be used to perform an alignment routine such that the beam spot 115 of the semiconductor laser 110 is aligned with the waveguide portion 124 of the wavelength conversion device 120.

The adjustable mirror illustrated schematically in FIG. 1 can take a variety of conventional or yet to be developed forms. In one embodiment, it is contemplated that the adjustable mirror is a mirror operatively coupled to a drive mechanism such that the angular orientation of the mirror may be adjusted on 2 axes such that the position of the beam spot 115 may be varied on the input face 122 of the wavelength conversion device 120. In another embodiment, it is contemplated that the drive mechanism of the adjustable mirror 130 may comprise one or more movable micro-opto-electro-mechanical systems (MOEMS) or micro-electro-mechanical system (MEMS) operatively coupled to a mirror such that the angular orientation of the mirror may be adjusted on at least 2 axes. The MEMS or MOEMS devices may be configured and arranged to vary the position of the beam spot 115 on the input face 122 of the wavelength conversion device 120. Since the mirror is located in the collimated or nearly-collimated beam space of the optical system, adjustment of the mirror angle will result in a change in the x/y position of the beam spot at the input face of the wavelength conversion device. Use of MEMS or MOEMS devices enables adjustment of the beam spot position to be done extremely rapidly over large ranges. For example, a MEMS mirror with a ±1 degree mechanical deflection, when used in conjunction with a 3 mm focal length lens, may allow the beam spot to be angularly displaced ±100 μm on the input face of the wavelength conversion device. The adjustment of the beam spot may be done at frequencies on the order of 100 Hz to 10 kHz due to the fast response time of the MEMS or MOEMS device. Alternatively or additionally, the adjustable mirror 130 may comprise one or more liquid lens components configured for beam steering and/or beam focusing. Still further, it is contemplated that the adjustable mirror 130 may comprise one or more mirrors and/or lenses mounted to micro-actuators.

Figure 9:
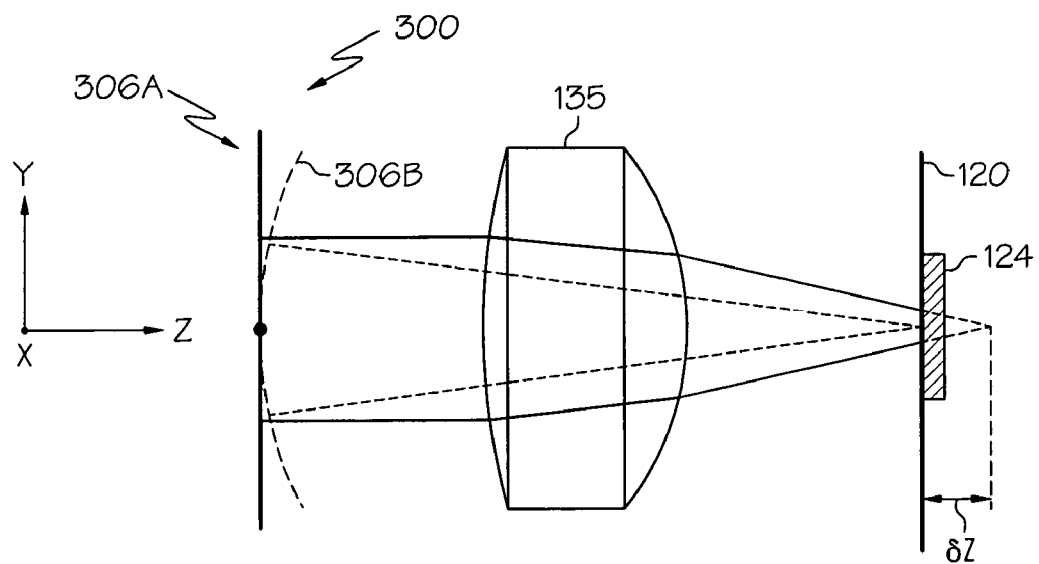
FIG. 9 depicts the optical effect of the thermal deformation of the MEMS mirror of FIGS. 7-8 as shown and describe herein.

While an adjustable mirror 130, such as a mirror operatively coupled to a MOEMS or MEMS device or other actuator, may facilitate repositioning the mirror about the x and y axes and, therefore, positioning the beam spot on the input face of the wavelength conversion device 120 in the x and y directions, the adjustable mirror 130 does not allow for adjustment of the focused spot in the z direction, and therefore may not be used to focus or refocus the beam spot on the input face of the wavelength conversion device. While some MEMS mirror designs do provide mechanisms for positioning the mirror (pure movement of the mirror in the z direction), when the mirror is placed in the collimated or near collimated beam space of the optical package, positioning the mirror in this manner will not result in an appreciable change in the z location of the focused beam spot. Accordingly, in order to facilitate focusing or refocusing the beam spot 115 on the wavelength conversion device 120, the adjustable mirror 130 may also be made deformable. For example, as shown in FIG. 9, if the surface of the adjustable mirror (300 in FIG. 9) is cylindrically deformed, the focal point of rays reflected by the mirror is altered in the z-direction. Accordingly, by controlling the deformation of the adjustable mirror 130 the beam spot 115 of the semiconductor laser 110 may be focused on the input face of the wavelength conversion device 120 and, more specifically, on the waveguide portion 124 of the wavelength conversion device 120.

Figure 6:
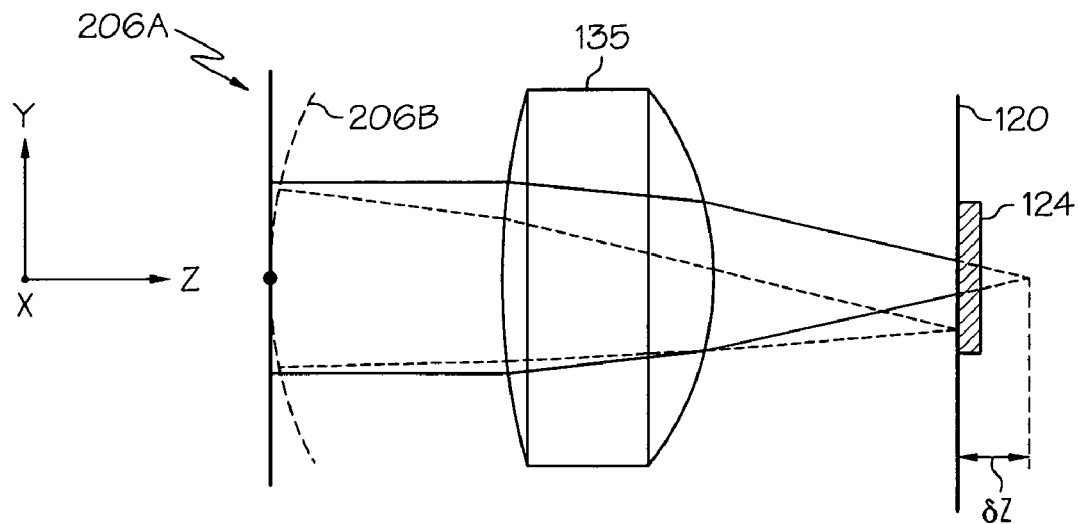
FIG. 6 depicts the optical effect of the mechanical deformation of the MEMS mirror of FIGS. 3-5 as shown and described herein.

The lens assembly 135 used in conjunction with the MEMS mirror influences how much mirror distortion is needed to generate a given amount of z axis change in focus. A lens assembly 135 is desired because the highly divergent beam of the semiconductor laser must be collimated and refocused into the crystal. The numerical apertures of the semiconductor laser and wavelength conversion device are quite large—on the order of 0.15 to 0.3 depending on the axis. In order to capture all of the light emitted from the semiconductor laser requires a high numerical aperture lens assembly, in some cases greater than about 0.3. The lens assembly may also have a relatively short focal length so as to minimize overall package size. If the mirror is spherically or cylindrically deformed, then for the optical package shown in FIG. 1 the change in the image position δz along the z axis may be described by $$\delta z = \frac{2 \cdot f^2 \cdot \delta R_c}{R_c' \cdot R_c}$$

where f is the focal length of the lens assembly, Rc and Rc' are the initial and final radii of curvature of the mirror, and δRc is the change in radius of curvature of the mirror. Alternatively, this may be expressed as a change in the peak to valley deformation of the mirror, Δ, over the illuminated mirror region, such that $$\delta z = \frac{-4 \cdot f^2 \cdot \Delta}{r_0^2}$$

where $r_0$ is the radius of the semiconductor laser beam at the mirror. This formula shows that the change in focus, δz, observed for an applied mirror deformation, Δ, is directly related to the focal length of the lens used. The resulting change in focus δz is illustrated in FIG. 6. Therefore it is advantageous to use a lens assembly have a longer focal length to achieve larger amounts of focus adjustment, as long as the numerical aperture of the lens assembly is kept equal to or greater than the numerical aperture of the semiconductor laser and the wavelength conversion device. However, the focal length should not be too long as this makes it difficult to keep the size of the optical package small as the diameter of the lens assembly would need to increase with increasing focal length if a high numerical aperture is to be maintained. In one embodiment, the lens assembly may have a focal lengths from about 1 mm to about 5 mm. An optical package with such a lens assembly can easily create an amplification of change in focus, δz, to mirror distortion, Δ, on the order of about 20:1.

Figure 3:
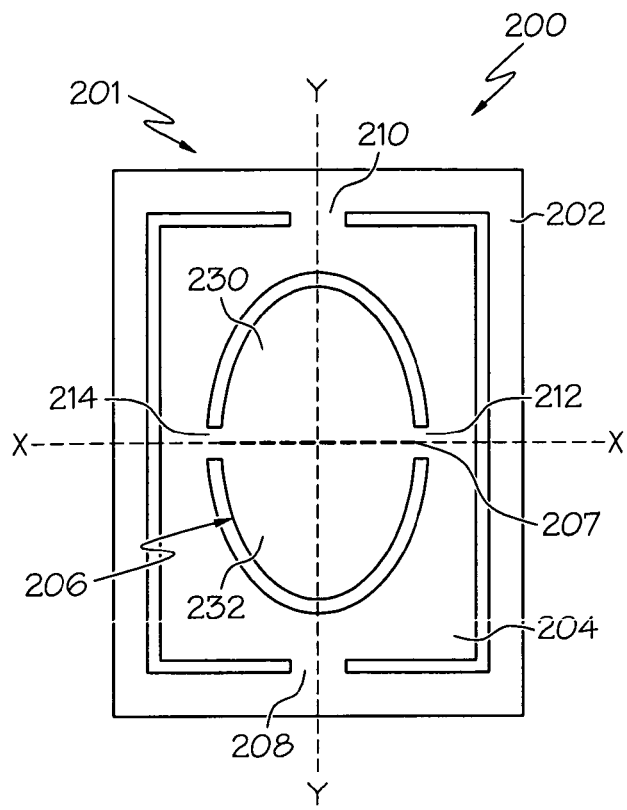
FIG. 3 depicts the front side of a deformable MEMS mirror according to one embodiment shown and described herein.
Figure 4:
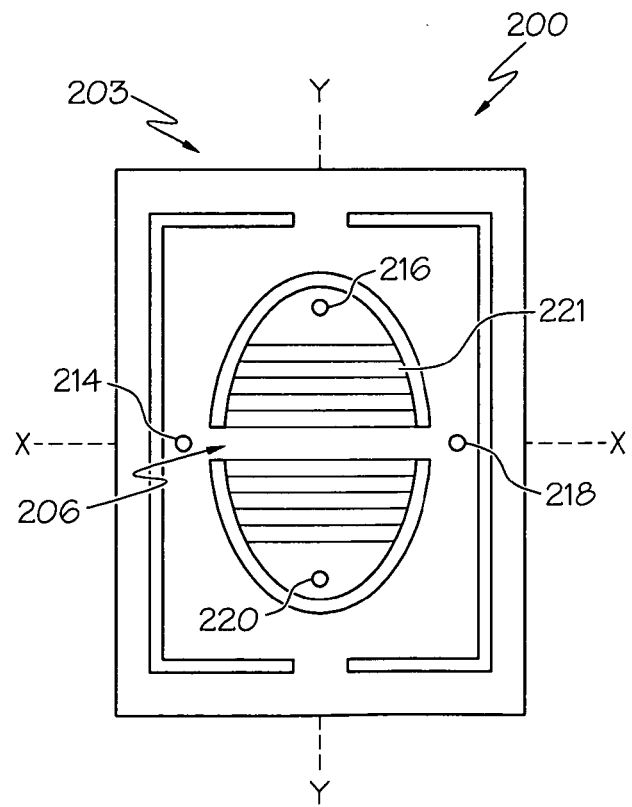
FIG. 4 depicts the textured back side of a deformable MEMS mirror according to one embodiment of the optical package shown and described herein.
Figure 5:
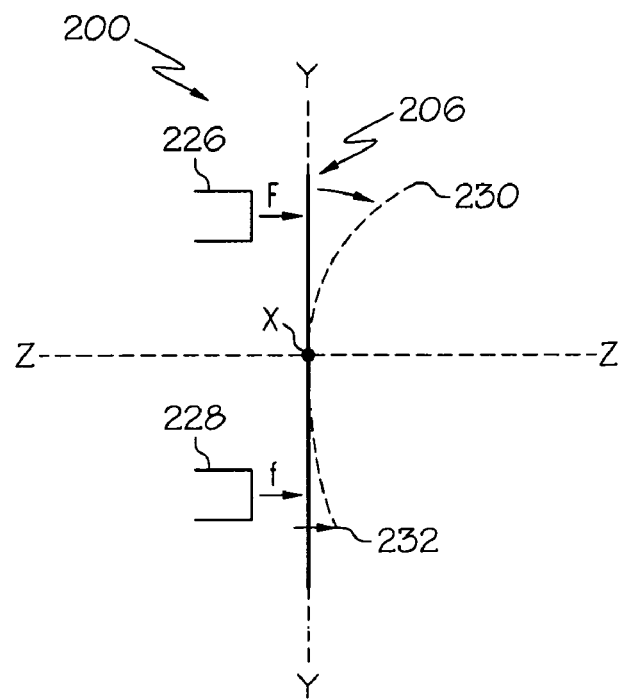
FIG. 5 is a schematic illustration of a deformable MEMS mirror being mechanically deformed about the x-axis according to one embodiment of an optical package shown and described herein.

Referring now to FIGS. 3-5, in one embodiment, the adjustable mirror 130 may be a flexible mirror operatively coupled to a MEMS or MOEMS device. The adjustable mirror 130 (now MEMS mirror 200) may comprise an outer frame 202, an inner frame 204 and a mirror portion 206, as shown in FIG. 3 which depicts the front side 201 of the MEMS mirror 200. A line connecting the inner pivots 212, 214 defines a singular flexure pivot 207 extending across the mirror portion 206. The singular flexure pivot 207 may be constrained by inner pivots 212, 214. The singular flexure pivot 207 may also be constrained by the material of the mirror portion 206. The MEMS mirror 200 is substantially symmetric about the pivot axis of the singular flexure pivot 207 such that the singular flexure pivot 207 divides the mirror portion 206 into a first mirror region 230 and a second mirror region 232. The first mirror region 230 of the mirror portion 206 and the second mirror region 232 of the mirror portion 206 may be deformed relative to one another about the pivot axis of the flexure pivot 207 thereby providing deformation of the mirror portion 206. The mirror portion 206 is pivotally attached to the inner frame 204 by inner pivots 212, 214. The inner frame 204 is pivotally attached to the outer frame 202 by outer pivots 208, 210. The inner pivots 212, 214 and outer pivots 208, 210 may be integral with the mirror portion 206, the inner frame 204 and the outer frame 202 such as when the MEMS mirror 200 is constructed from a single piece of material. The inner pivots 214, 212 facilitate the rotation of the mirror portion 206 about the x-axis indicated in FIG. 3 while the outer pivots 208, 210 facilitate the rotation of the mirror portion 206 and the inner frame about the y-axis indicated in FIG. 3.

For ease of reference, the various embodiments of the adjustable mirror (e.g., the MEMS mirror, MOEMS mirror, etc.) shown in FIGS. 1, 3-9 and 11-12 are oriented such that the single axis of deformation of the mirror about which the mirror is deformed is collinear with the x-axis depicted in the figures. Further, where the adjustable mirror is a MEMS mirror or MOEMS mirror such as the adjustable mirrors depicted in FIGS. 3-9 and 11-12, the singular flexure pivot is collinear with the x-axis depicted in the figures. Accordingly, reference to deformation of the adjustable mirror about a single axis of deformation and/or the singular flexure pivot refers to deformation of the adjustable mirror about the x-axis.

Referring again to FIGS. 3-5, FIG. 5 shows a cross section of the MEMS mirror 200 of FIG. 3 along the y-axis. The MEMS mirror 200 may comprise positioning actuators 226, 228 which exert a force on the mirror portion 206 at actuator force points 216, 220. A similar pair of actuators (not shown) may be oriented along the x-axis and configured to exert a force on the inner frame 204 at actuator force points 214, 218. In one embodiment, the positioning actuators 226, 228 may apply an electrostatic or electromagnetic force to the mirror portion 206 which, when the applied forces are equal and opposite (e.g., the first actuator 226 pushes the mirror portion 206, the second actuator 228 pulls the mirror portion 206) results in a torque applied to the mirror portion 206 which causes the mirror portion 206 to pivot about the x-axis and thereby tilt or rotate out of the x-y plane. Because the forces are equal and opposite, the surface of the mirror remains substantially planar while it is tilted or rotated.

However, to facilitate a deformation of the mirror portion 206 about the x-axis, and thereby adjust the focus of the beam spot 115 on the wavelength conversion device 120, the positioning actuators 226, 228 may be utilized to introduce forces that act in the same direction, which, because the mirror is constrained from moving in the z direction by the singular flexure pivot point 207, will cause the mirror to be deformed about the pivot axis of the singular flexure pivot as the axis of deformation. For example, as shown in FIG. 4 depicting the back side 203 of the MEMS mirror 200, the first actuator 226 may be used to apply a force F to the actuator force point 216 of the mirror portion 206 and the second actuator 228 may be used to apply a force f to the actuator force point 220 of the mirror portion 206, wherein the magnitude of F>f and F and f are in the same direction. This results in a torque applied at the first mirror region 230 of the mirror portion 206 such that the mirror is forced in a clockwise direction about the x-axis.

A torque is also applied to the second mirror region 232 of the mirror portion 206 such that the mirror is forced in a counter-clockwise direction about the x-axis. The net torque, determined by the magnitude of (F–f), determines the net amount and direction of the mirror rotation. Accordingly, due to the application of forces in the same direction, which create torques in opposing directions about the pivot axis of the singular flexure pivot, the mirror portion 206 is deformed about the x-axis. Because the torques act on the mirror in opposite directions (e.g., clockwise and counter-clockwise) the result is a substantially cylindrical deformation of the MEMS mirror about the x-axis. Further, because the applied forces are unbalanced, the mirror will experience a net torque about the axis of rotation, producing an effective tilt of the mirror about the x-axis.

To facilitate the substantially cylindrical deformation of the MEMS mirror 200, the back side 203 of the mirror portion 206 may be textured as shown in FIG. 4. The texturing 221 may comprise grooves or channels scribed into or integrally formed with the back side 203 of the mirror portion 206. The texturing 221 decreases the rigidity of the mirror portion 206 such that, when the MEMS mirror 200 is deformed using unbalanced forces, the deformation results in the mirror portion 206 taking on a substantially cylindrical shape.

The optical effects of the cylindrical deformation and simultaneous tilt of the mirror portion 206 of the MEMS mirror 200 are schematically illustrated in FIG. 6 with the solid lines indicating the mirror portion 206A of the MEMS mirror 200 and associated reflected light prior to deformation and the dashed lines indicating the mirror portion 206B of the MEMS mirror 200 and associated reflected light after deformation. As shown in FIG. 6, prior to deformation light reflected from the mirror portion 206A is incident on the waveguide portion 124 of the wavelength conversion device 120. However, the focal point of this light is actually behind the surface of the wavelength conversion device 120.

The cylindrically deformed mirror portion 206B, combined with the tilt of the mirror about the x-axis, increases the convergence angle of light rays between the surface of the deformed mirror portion 206B and the wavelength conversion device 120 thereby focusing the light at a single point on the input face of the wavelength conversion device 120. Further, the tilt of the cylindrically deformed mirror also results in the beam spot 115 of the focused light being repositioned along the waveguide portion 124 of the wavelength conversion device such that, for example, the beam spot 115 is more concentric with the waveguide portion 124 of the wavelength conversion device 120.

Further, because the deformation of the mirror portion 206B is asymmetric with respect to the z-axis, and because the z-axis corresponds to the focal dimension of the mirror portion 206B, the light rays being focused on the surface of the waveguide portion 124 of the wavelength conversion device 120 is a result of the increased convergence angle caused by the substantially cylindrical deformation.

While the embodiments of the MEMS mirror 200 shown in FIGS. 3-5 generally show the use of two positioning actuators 226, 228 positioned on either side of a flexure pivot 207 to facilitate the deformation of the mirror portion 206 of the MEMS mirror 200, it should be understood that any number of positioning actuators may be used in conjunction with one or more flexure pivots to facilitate the deformation of the adjustable mirror. Accordingly, unless otherwise stated herein, no particular limitation is intended by the recitation of two positioning actuators used in conjunction with a single flexure pivot or the recited arrangement of the positioning actuators and the flexure pivot.

Figure 7:
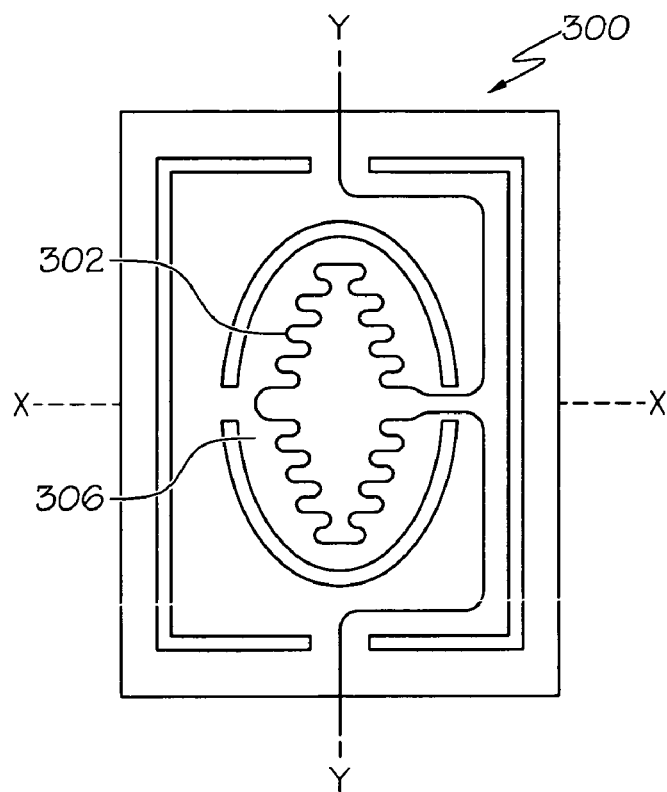
FIG. 7 depicts a deformable MEMS mirror comprising a heater according to one embodiment of the optical package shown and described herein.
Figure 8:
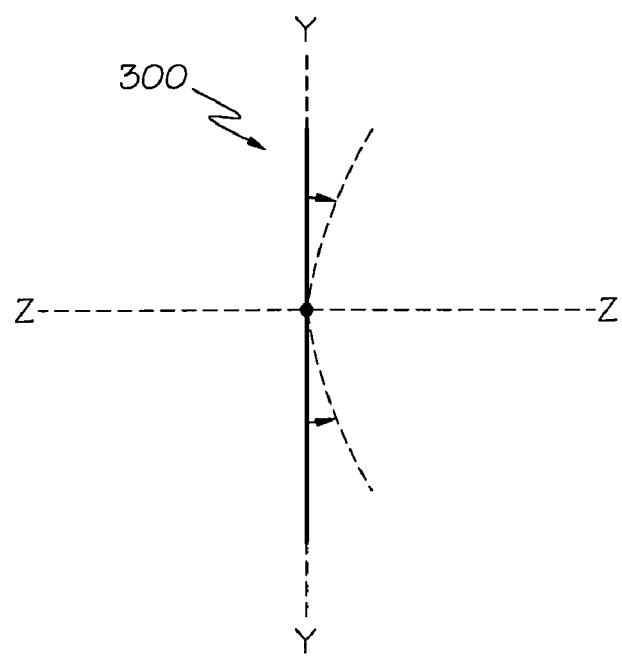
FIG. 8 depicts the deformable MEMS mirror of FIG. 7 being thermally deformed about the x-axis according to one embodiment of an optical package shown and described herein.

Referring now to FIGS. 7-8, in another embodiment, a MEMS mirror 300 having a similar configuration as the MEMS mirror 200 shown in FIGS. 3 and 4 may comprise a heater 302, such as a micro heater or resistive heater, disposed on a surface of the mirror portion 306 of the MEMS mirror 300. For example, in one embodiment, the heater 302 may be positioned on the back side of the mirror portion 306. When the mirror portion 306 is heated, the difference in the coefficient of thermal expansion between the front and back sides of the mirror portion 306 causes the mirror to deform as shown in FIG. 8 depicting a cross section of the MEMS mirror 300 along the y-axis. In one embodiment, the mirror portion 206 is uniformly heated such that the resulting deformation is substantially cylindrical about a single axis of deformation, specifically the x-axis in the embodiment shown in FIG. 8.

To enhance or amplify the effects of thermal deformation, the mirror portion 306 may comprise a coating bonded to a surface of the mirror portion 306. In one embodiment, the coating (not shown) may have a different coefficient of thermal expansion than the substrate material from which the MEMS mirror 300 is produced. In another embodiment, the coating may have a relatively greater coefficient of thermal expansion than the substrate material of the MEMS mirror 300 such that the coating may have a relatively large expansion for a given amount of applied thermal energy. In this embodiment, the coating may be applied to the back side of the mirror portion 306 opposite the mirrored front side of the mirror portion 306. Because the coating is bonded to and constrained by the mirror portion 306, the thermal expansion of the coating causes the deformation of the mirror portion 306 as depicted in FIG. 8. Accordingly, the applied coating may be selected to achieve a desired amount of deformation of the mirror portion 306 with a corresponding minimal amount of applied thermal energy. The coating may include gold, silver, aluminum, or one or more layers of dielectric material optimized for high reflectivity at the operating wavelength of the mirror.

In another embodiment, the deformable mirror may be used in conjunction with a plastic lens assembly, such as a polycarbonate lens assembly, wherein the focal length of the plastic lens assembly is sensitive to temperature variations. The focal length of the lens assembly, and therefore the focus of the lens assembly, may be adjusted and controlled by controlling the temperature of the plastic lens assembly.

The optical effects of the cylindrical deformation of the MEMS mirror 300 about the x-axis are graphically illustrated in FIG. 9 wherein the solid lines indicate the mirror portion 306A of the MEMS mirror 300 and associated reflected light rays prior to deformation and the dashed lines indicate the mirror portion 306B of the MEMS mirror 300 and associated reflected light rays after deformation. Prior to deformation, light reflected from the mirror has a focal point behind the surface of the wavelength conversion device 120 along the z-axis. As a result, light rays incident on the surface of the waveguide portion 124 of the wavelength conversion device 120 are not focused on a single point. However, light rays reflected by the cylindrically deformed mirror portion 306B have an increased angle of convergence as a result of the cylindrical shape of the mirror and are, as a result, focused on the surface of the waveguide portion 124 of the wavelength conversion device 120 at a single point.

Accordingly, the adjustable mirror 130 shown in FIG. 1 may be a deformable MOEMS/MEMS mirror so as to facilitate focus adjustment of a beam of the semiconductor laser 110 onto the wavelength conversion device 120. Further, while specific reference is made herein to the adjustable mirror 130 being an adjustable MOEMS/MEMS mirror, it should be understood that the adjustable mirror 130 may also comprise a mirror operatively associated with one or more actuators which may be used to position the mirror about the x- and y-axes, as shown in FIG. 1, such that a beam of the semiconductor laser may be laterally positioned on the input face of the wavelength conversion device. It should also be understood that the actuators operatively associated with the mirror may be used to apply unbalanced forces and/or unbalanced torques to the mirror such that the mirror may be deformed as described hereinabove. Finally, it will also be understood that the mirror may also comprise one or more heaters positioned on a surface of the mirror to facilitate the application of thermal energy to the mirror and therefore induce a controlled amount of deformation in the mirror.

Referring again to FIG. 1, it should now be understood that the semiconductor laser 110, the adjustable mirror 130 and the wavelength conversion device 120 may be oriented with respect to one another to define an optical pathway between the output of the semiconductor laser 110 and an input of the wavelength conversion device 120. More specifically, the semiconductor laser 110, adjustable mirror 130, and wavelength conversion device 120 may be configured to form a folded optical pathway as shown in FIG. 1 in which the adjustable mirror 130 is configured to fold the optical path such that the optical path initially passes through the lens assembly 135 to reach the adjustable mirror 130 as a collimated or nearly collimated beam and subsequently returns through the same lens assembly 135 to be focused on the wavelength conversion device 120. This type of optical configuration is particularly applicable to wavelength converted laser sources where the cross-sectional size of the laser beam generated by the semiconductor laser is close to the size of the waveguide on the input face of the wavelength conversion device 120, in which case a magnification close to one would yield optimum coupling in positioning the beam spot on the input face of the wavelength conversion device 120. For the purposes of defining and describing the present invention, it is noted that reference herein to a "collimated or nearly collimated" beam is intended to cover any beam configuration where the degree of beam divergence or convergence is reduced, directing the beam towards a more collimated state.

The lens assembly 135 can be described as a dual function, collimating and focusing optical component because it serves to collimate the divergent light output of the laser and refocus the laser light propagating along the optical path of the package into the waveguide portion of the wavelength conversion device. This dual function optical component is well suited for applications requiring magnification factors close to one because the lens assembly 135 is used for both collimation and focusing. More specifically, as is illustrated in FIG. 1, laser light output from the semiconductor laser 110 is, in sequence, refracted at the first face 131 of the lens assembly 135, refracted at the second face 132 of the lens assembly 135, and reflected by the adjustable mirror 130 in the direction of the lens assembly 135. Once the laser light is reflected back in the direction of the lens assembly 135, it is first refracted at the second face 132 of the lens assembly 135 and subsequently refracted at the first face 131 of the lens assembly 135, for focusing on the input face of the wavelength conversion device 120.

While FIG. 1 depicts the optical package as including a lens assembly 135, it should be understood that, at least in one embodiment, the beam of the semiconductor laser 110 may be reflected by the adjustable mirror 130 and focused on the input face of the wavelength conversion device 120 without the use of the lens assembly 135.

In particular embodiments of the present invention, the adjustable mirror 130 is placed close enough to the image focal point of the lens assembly 135 to ensure that the principle ray incident on the input face 122 of the wavelength conversion device 120 is approximately parallel to the principle ray at the output of the optical package. It may also be shown that the configuration illustrated in FIG. 1 also presents some advantages in term of aberration. Indeed, when the output face of the semiconductor laser 110 and the input face of the wavelength conversion device 120 are positioned in approximate alignment with the object focal plane of the lens assembly 135 and the output waveguide of the semiconductor laser 110 and the input waveguide of the wavelength conversion device 120 are symmetric with respect to the optical axis of the lens assembly 135, it is contemplated that anti symmetric field aberrations, such as coma, can be automatically corrected.

Figure 11:
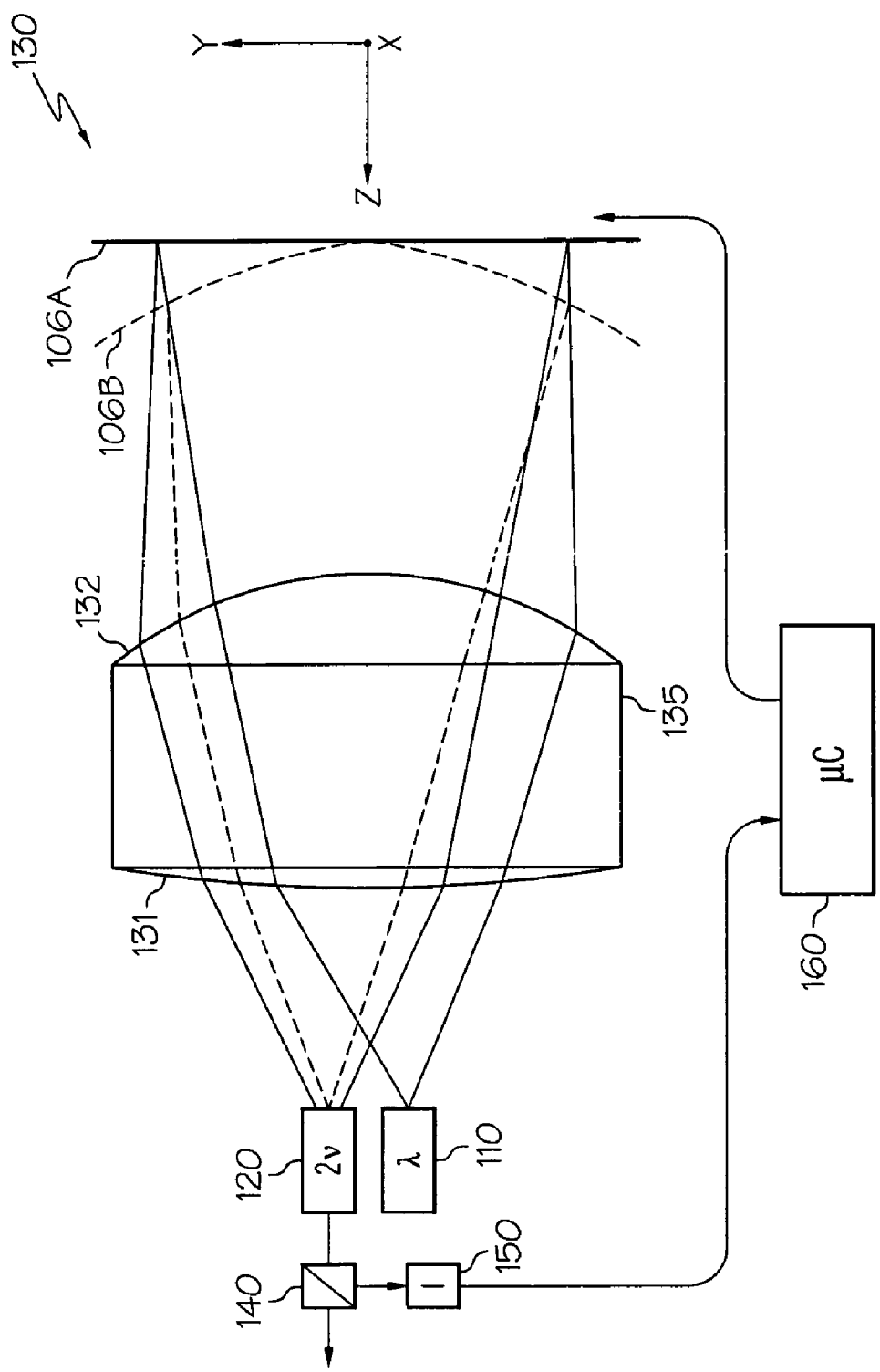
FIG. 11 depicts an optical package incorporating an adjustable mirror according to one embodiment shown and described herein.

Referring now to FIG. 11, an optical package is shown having an adjustable mirror 130 that may be deformed to alter the optical pathway between the semiconductor laser 110 and the wavelength conversion device 120 such that the beam of the semiconductor laser may be focused on a waveguide portion 124 of the wavelength conversion device 120. As shown by the solid lines representing rays of the semiconductor laser 110 propagating through the optical package in FIG. 11, when the adjustable mirror 130 is not deformed, the laser beam of semiconductor laser 110 is focused behind the input face of the wavelength conversion device 120. As such, the laser beam incident on the input face of the wavelength conversion device 120 is not focused and, as a result, the output intensity of the wavelength conversion device is diminished.

In order to focus the beam of the semiconductor laser 110 on the waveguide portion 124 of the wavelength conversion device 120, the adjustable mirror 130 may comprise a deformable adjustable mirror such as the MEMS mirrors described hereinabove. For example, the adjustable mirror 130 shown in FIG. 11 may be a MEMS mirror having a heater attached to the surface of the mirror such that the mirror may be deformed symmetrically about the x-axis. The mirror portion 306 of the adjustable mirror 130 is deformed such that the deformation is substantially cylindrical with the radial axis of symmetry of the cylinder being collinear with the z-axis (e.g., perpendicular to the axis about which mirror is deformed). For example, in the embodiment shown in FIG. 11, the mirror portion 306 of the adjustable mirror 130 is heated thereby deforming the mirror about the x-axis such that the resulting cylindrical shape is symmetric with respect to the z-axis. The deformation of the adjustable mirror 130 causes light incident on the mirror to have a greater angle of convergence than light reflected from the non-deformed mirror. Accordingly, because of the increased convergence, the optical pathway of the beam (i.e., the path indicated by the dashed lines) between the semiconductor laser and the wavelength conversion device is altered such that the beam of the semiconductor laser 110 is focused on the input face of the wavelength conversion device.

Figure 12:
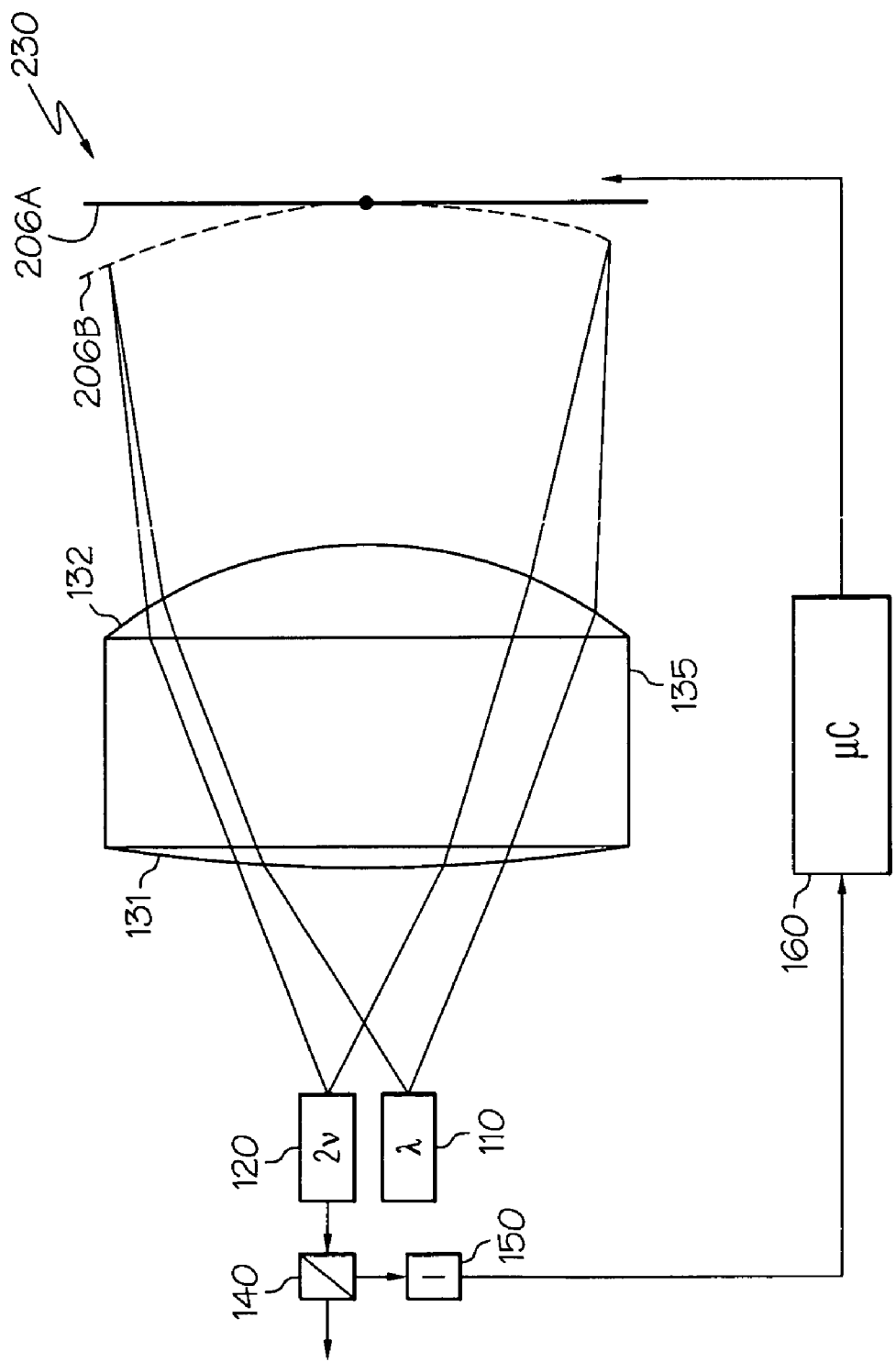
FIG. 12 depicts an optical package incorporating an adjustable mirror according to another embodiment shown and described herein.

Referring now to FIG. 12, in another embodiment, the adjustable mirror may be deformed by the application of unbalanced forces and/or unbalanced torques to the mirror, such as when the adjustable mirror 130 is a MEMS mirror capable of being deformed by the application of unbalanced forces and/or unbalanced torques to the mirror by the MEMS actuators. Alternatively, in another embodiment, the unbalanced forces and/or torques applied to the adjustable mirror 130 may be a result of the application of different amounts of thermally energy to the adjustable mirror causing the non-symmetric or asymmetric deformation of the mirror about an axis of deformations. In the embodiment shown in FIG. 12, the application of unbalanced forces and/or torques on the mirror causes the mirror to deform about the x-axis. The unbalanced forces and/or torques may also cause the mirror to be tilted about the x-axis. The resulting deformation due to the application of unbalanced forces and/or torques results in the deformed adjustable mirror being asymmetric with respect to the focal axis (z-axis). In another embodiment, the change in curvature of the mirror may be caused exclusively by the application of heat, and the rotation of the mirror may by due to the application of external forces from electromagnetic or electrostatic actuators. The deformation of the adjustable mirror 130 causes light incident on the mirror to be reflected with a greater angle of convergence than light reflected from the non-deformed adjustable mirror 130. Accordingly, because of the increased convergence, the optical pathway of the beam between the semiconductor laser and the wavelength conversion device is altered such that the beam of the semiconductor laser 110 is focused on the input face of the wavelength conversion. Because of the tilt introduced by the applied forces, the focal point of the beam is also shifted over the input face of the wavelength conversion device 120.

Figure 10:
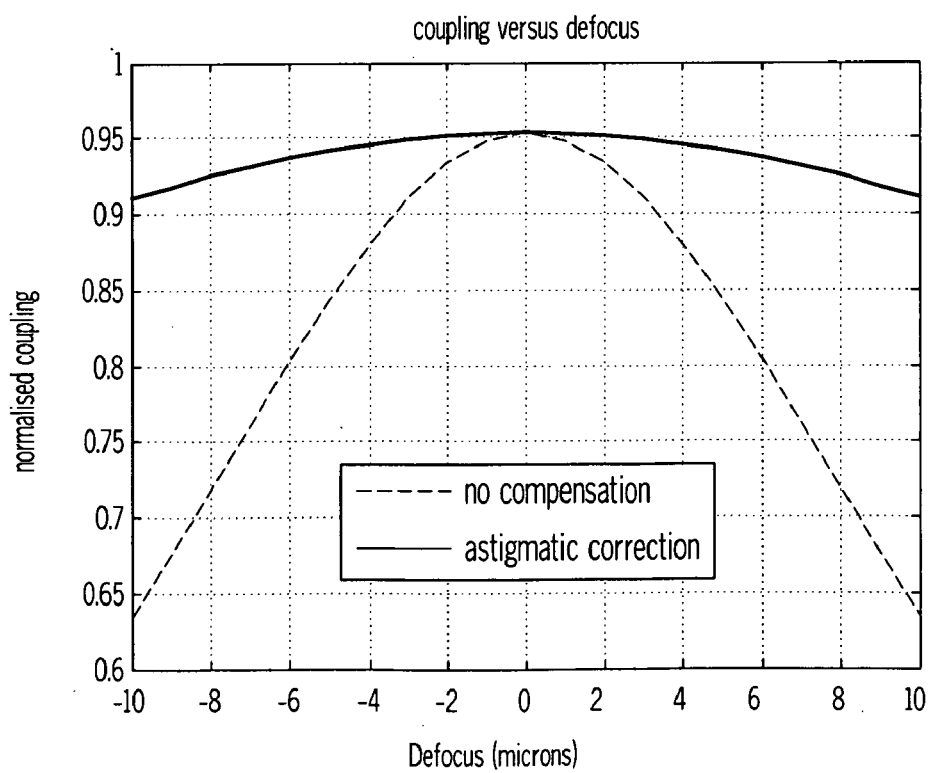
FIG. 10 graphically illustrates the improvement in the optical coupling between a semiconductor laser and a wavelength conversion device by applying astigmatic correction through deforming the adjustable MEMS mirror about a single axis.

Further, the non-symmetrical or asymmetrical deformation of the mirror with respect to the z-axis due to the application of unbalanced forces and/or torques or, alternatively, the application of different amounts of thermal energy, introduces some astigmatism into the optical pathway between the semiconductor laser and the wavelength conversion device. Accordingly, the light incident on the input face of the wavelength conversion device is not a product of pure focus, but rather a result of improved focus and astigmatism. However, this astigmatism can be used to correct or compensate for other optical aberrations in the optical package. For example, in one embodiment, the semiconductor laser may be configured and positioned such that the output beam of the semiconductor laser has a major axis of divergence (e.g., the fast axis of the beam) and a minor axis of divergence (e.g., the slow axis of the beam) with the minor axis of divergence parallel to the singular flexure pivot of the MEMS mirror and the major axis of divergence perpendicular to the singular flexure pivot of the MEMS mirror. Referring to FIG. 12, the major axis of divergence is parallel to the y-axis while the minor axis of divergence is parallel to the x-axis. The deformable mirror may be positioned such that, when the deformable mirror is both deformed and tilted about the single axis of deformation, in this example the x-axis, the adjustable mirror has a greater effect on light rays of the beam along the major axis of divergence than light rays along the minor axis of divergence. For example, the deformed adjustable mirror may reflect and converge light rays having a relatively higher angle of divergence more than light rays having a relatively lower angle of divergence. Referring to FIG. 4, this may be accomplished, for example, by applying force to points 216 and 220, while not points 206 and 218. Such force would cause the mirror to curve around the x-axis, but not the y-axis. If the y-axis was the major axis of divergence of the beam, then such a technique may recover most of the coupling loss between the two waveguides caused by system defocus by increasing the convergence of the reflected beam along the major axis of divergence. The relationship of the coupling between the semiconductor laser and the wavelength conversion device is graphically illustrated in FIG. 10. The dashed line is indicative of the coupling when no compensation or correction mirror (e.g., the MEMS mirror is not deformed) is employed while the solid line indicates astigmatic correction of the defocus (e.g., the MEMS mirror is deformed). FIG. 10 indicates that the coupling between the semiconductor laser and the wavelength conversion device of the optical package shown in FIG. 1 may be improved by deforming the MEMS mirror about a single axis (such as the x-axis, as mentioned above) thereby introducing astigmatic focus correction into the optical package.

In another embodiment, the controller 160 may be used to control the shape of the adjustable mirror and, therefore, the focus of the adjustable mirror. As discussed herein, the controller 160 may be utilized to control a position or state of the adjustable mirror 130 and thereby facilitate the lateral alignment of the beam of the semiconductor laser with the waveguide portion of the wavelength conversion device in the x-y plane. The controller 160 may also be configured to control the shape of the adjustable mirror 130 by providing the appropriate signals to the adjustable mirror 130 to cause the deformation of the adjustable mirror 130. For example, in one embodiment, in addition to the controller 160 being used to adjust the position of the adjustable mirror 130 via positioning actuators operatively associated with the adjustable mirror 130, the controller 160 may also be used to adjust the force and/or torque applied to the adjustable mirror 130 by each individual positioning actuator thereby facilitating controlled deformation of the mirror through the application of unbalanced forces and/or torques. In another embodiment, the controller 160 may be configured to control the amount of thermal energy supplied by heaters positioned on the adjustable mirror 130. More specifically, the controller 160 may be configured to adjust the current supplied to the heater and, therefore, the amount of thermal energy produced by the heater. By regulating and controlling the thermal energy produced by the heater, the controller 160 also controls the deformation of the adjustable mirror and therefore the focus of the adjustable mirror.

Further, the controller 160 may also be configured for closed-loop control of the focus of the adjustable mirror. As discussed herein, the controller may be operatively connected to an optical sensor 150 which provides the controller with a signal indicative of the output intensity of the adjustable optical component. Based on this signal, the controller 160 may be configured to adjust both the position of the beam on the input face of the wavelength conversion device and the shape of the adjustable mirror 130 such that the beam is both positioned and focused on the waveguide portion 124 of the wavelength conversion device 120 and the output intensity of the wavelength conversion device 120 is maximized.

It should now be understood that the use of an adjustable and deformable mirror in the optical package described herein facilitates adjusting the focus of the beam of the semiconductor laser on the wavelength conversion device. This focus adjustment facilitates the optimization of the output intensity of the optical package throughout the lifetime of the device. For example, should the device be exposed to elevated temperatures, the relative position of components in the optical package may change and, as a result, the semiconductor laser may no longer be focused on the wavelength conversion device. However, the use of the deformable adjustable mirror facilitates refocusing the semiconductor laser on the wavelength conversion device thereby compensating for the thermal effects. Further, incorporating focus adjustment in the optical component loosens the tolerances that must be maintained during the manufacture of the device. Accordingly, this reduces the complexity of the manufacturing process and, as such, the overall cost of the optical package.

It is contemplated that the optical package of the present invention may be applicable to color image-forming laser projection systems, laser-based displays such as heads-up displays in automobiles, or any laser application having a wavelength converted output where optical alignment and focus are issues. It is further contemplated that the alignment methods discussed herein will have utility in conjunction with a variety of semiconductor lasers, including but not limited to DBR and DFB lasers, Fabry-Perot lasers, and many types of external cavity lasers.

It is to be understood that the preceding detailed description of the invention is intended to provide an overview or framework for understanding the nature and character of the invention as it is claimed. It will be apparent to those skilled in the art that various modifications and variations can be made to the present invention without departing from the spirit and scope of the invention. Thus, it is intended that the present invention cover the modifications and variations of this invention provided such modifications and variations come within the scope of the appended claims and their equivalents.

It is noted that terms like "preferably," "commonly," and "typically," if utilized herein, should not be read to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is noted that recitations herein of a component being "programmed" in a particular way, "configured" or "programmed" to embody a particular property or function, are structural recitations as opposed to recitations of intended use. More specifically, the references herein to the manner in which a component is "programmed" or "configured" denotes an existing physical conditions of the component and, as such, is to be taken as a definite recitation of the structural characteristics of the component. For example, references herein to a lens assembly and an adjustable mirror being "configured" to direct a laser beam in a particular manner denotes an existing physical condition of the lens assembly and the adjustable mirror and, as such, is to be taken as a definite recitation of the structural characteristics of the lens assembly and the adjustable mirror.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed:

1. An optical package comprising a semiconductor laser, a wavelength conversion device, a lens assembly, and an adjustable minor, wherein:
    the wavelength conversion device comprises a waveguide portion;
    the semiconductor laser, the adjustable mirror and the wavelength conversion device are oriented to form a folded optical pathway between an output of the semiconductor laser and an input of the wavelength conversion device such that a beam of the semiconductor laser is directed through the lens assembly and onto the adjustable mirror and reflected by the adjustable mirror back through the lens assembly and onto the waveguide portion of the wavelength conversion device;
    the adjustable mirror comprises a singular flexure pivot about which the adjustable minor is cylindrically deformed thereby altering a radius of curvature of the adjustable mirror and adjusting the focal length of the adjustable mirror such that the beam of the semiconductor laser may be focused on the waveguide portion of the wavelength conversion device;
    the beam of the semiconductor laser has a major axis of divergence and a minor axis of divergence and the semiconductor laser is positioned such that the minor axis of divergence is parallel to the pivot axis of the singular flexure pivot;
    the optical package is programmed such that the beam of the semiconductor laser has a fast axis and a slow axis and the slow axis of the beam is parallel to the singular flexure pivot of the adjustable mirror;
    the adjustable mirror comprises a first mirror region and a second minor region positioned on opposite sides of the singular flexure pivot, a first positioning actuator is positioned to apply a first force to the first minor region of the adjustable mirror, a second positioning actuator is positioned to apply a second force to the second mirror region of the adjustable mirror, and the optical package is programmed such that the first and second forces act in the same direction;
    the optical package is further programmed to control the deformation of the adjustable mirror and a tilt of the adjustable mirror about the pivot axis of the singular flexure pivot by controlling a magnitude and direction of the first force applied to the first mirror region by the first positioning actuator and a magnitude and direction of the second force applied to the second mirror region by the second positioning actuator; and
    the angular orientation of the adjustable mirror may be adjusted such that the beam of the semiconductor laser may be positioned along two directions on the waveguide portion of the wavelength conversion device.

2. The optical package of claim 1 wherein the adjustable mirror comprises at least one heater disposed on a surface of the adjustable mirror such that, when the adjustable mirror is heated by the at least one heater, the adjustable mirror is cylindrically deformed about the pivot axis of the singular flexure pivot thereby altering the radius of curvature of the adjustable mirror and adjusting the focal length of the adjustable mirror.

3. The optical package of claim 2 wherein the fast axis of the beam is perpendicular to the singular flexure pivot of the adjustable minor.

4. The optical package of claim 2 wherein the adjustable mirror comprises a front side and a back side and wherein the front side is mirrored and the back side is textured to decrease the rigidity of the adjustable mirror in a direction perpendicular to the singular flexure pivot.

5. The optical package of claim 2 wherein the adjustable mirror comprises a substrate material and a coating and the coating has a coefficient of thermal expansion different than that of the substrate material.

6. The optical package of claim 5 wherein:
    the adjustable mirror comprises a front side and a back side;
    the front side of the adjustable mirror is mirrored;

the at least one heater is positioned on the back side of the adjustable mirror;

the coating is applied to the back side of the adjustable mirror; and the coefficient of thermal expansion of the coating is greater than the coefficient of thermal expansion of the adjustable mirror such that, for a given temperature change, the coating expands more than the adjustable mirror thereby causing the adjustable mirror to deform about the pivot axis of the singular flexure pivot such that the adjustable mirror is deflected towards the front side of the adjustable mirror.

7. The optical package of claim 5 wherein the coating is selected based on a difference between the coefficient of thermal expansion of the coating and the coefficient of thermal expansion of the adjustable mirror such that, for a relatively small temperature increase, the coating has a large expansion relative to the adjustable mirror.

8. The optical package of claim 1 wherein the adjustable mirror comprises at least two actuators for applying a force to the adjustable mirror thereby deforming the adjustable mirror about the pivot axis of the singular flexure pivot.

9. The optical package of the claim 8 wherein the actuators are electromagnetic actuators and/or electrostatic actuators.

10. The optical package of claim 8 wherein the adjustable mirror comprises a front side and a back side and wherein the front side is mirrored and the back side is textured to decrease the rigidity of the adjustable mirror in a direction perpendicular to the singular flexure pivot.

11. The optical package of claim 1 wherein:

the first mirror region and the second mirror region are positioned about the singular flexure pivot such that the adjustable mirror is symmetric about the pivot axis of the singular flexure pivot; and the first positioning actuator and the second positioning actuator are equidistant from the singular flexure pivot.

12. The optical package of claim 1 wherein the optical package is programmed such that the magnitude of the first torque is different than the magnitude and direction of the second torque.

13. The optical package of claim 1 wherein, when the adjustable mirror is deformed, the deformed adjustable mirror is tilted about the pivot axis of the singular flexure pivot.

14. The optical package of claim 1 wherein the major axis of divergence is perpendicular to the pivot axis of the singular flexure pivot of the adjustable mirror.

15. The optical package of claim 1 wherein the adjustable mirror comprises a deformable mirror operatively attached to a micro-electro-mechanical system or a micro-opto-electro-mechanical system.

16. The optical package of claim 1 wherein the lens assembly has a focal length of less than about 5 mm and a numerical aperture of greater than about 0.25.

17. The optical package of claim 1 wherein a focal length of the lens assembly may be adjusted by heating the lens assembly.

* * * * *

UNITED STATES PATENT AND TRADEMARK OFFICE
CERTIFICATE OF CORRECTION

PATENT NO. : 7,916,769 B2  Page 1 of 1
APPLICATION NO. : 12/427939
DATED : March 29, 2011
INVENTOR(S) : Jacques Gollier et al.

It is certified that error appears in the above-identified patent and that said Letters Patent is hereby corrected as shown below:

| Col. | Line | should read: |
|---|---|---|
| 13 | 62 | --able mirror, wherein:-- |
| 14 | 8 | --about which the adjustable mirror is cylindrically-- |
| 14 | 24 | --second mirror region positioned on opposite sides of the-- |
| 14 | 26 | --tioned to apply a first force to the first mirror region of the-- |
| 14 | 54 | --adjustable mirror.-- |

Signed and Sealed this
Thirteenth Day of March, 2012

David J. Kappos
*Director of the United States Patent and Trademark Office*